E. SAMPSON.
Balance Scales.
No. 16,302.
Patented Dec. 23, 1856.
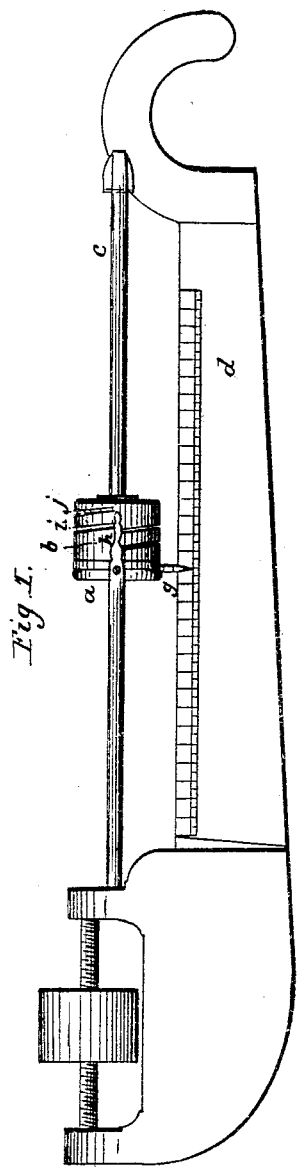
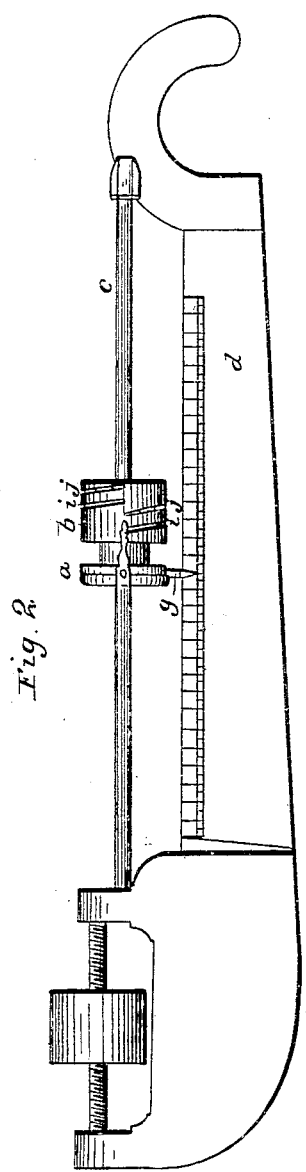
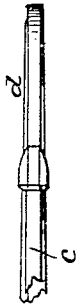
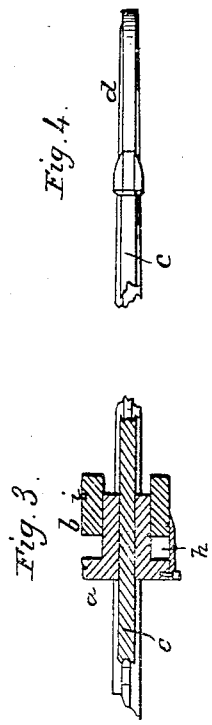

UNITED STATES PATENT OFFICE.

E. SAMPSON, OF VERGENNES, VERMONT, ASSIGNOR TO THE "VERGENNES SCALE MANUFG. CO.," OF VERGENNES, VERMONT.

WEIGHING-SCALE.

Specification of Letters Patent No. 16,302, dated December 23, 1856.

*To all whom it may concern:*

Be it known that I, ELNATHAN SAMPSON, of Vergennes, in the county of Addison and State of Vermont, have invented a new and useful Improvement in Weighing-Scales; and I do hereby declare that the following is a full and exact description thereof, reference being had to the accompanying drawings, making a part of this specification.

In the accompanying drawings Figures 1 and 2, are side views of a scale beam surmounted by my improved compound weighing poise with its respective parts $a$, and $b$, arranged in different positions; Fig. 3, a section of the said poise and a portion of its supporting rod $c$; and Fig. 4, a top view of a portion of the rear end of the beam.

The rod $c$, is so secured to the lug $f$, and to the upwardly curving outer end of the beam $d$, as to be parallel with the upper edge of said beam. The portion $a$, of the compound weighing poise, is in the form of a hollow cylinder having a round flanch, or button head, radiating from its inner end; the aperture therein being of such a size and made so smooth, that the poise can slide freely upon the rod $c$. The portion $b$, of said poise, is of a tubular shape, and of such a size that it slides freely on to the cylindrical portion of the other part of the poise, while its outer diameter corresponds with that of the flanch that radiates from the said cylindrical portion of the poise.

A forked pointer $g$, descends from the head of the portion $a$, of the weighing poise and loosely embraces the upper edge of the beam; thereby serving to point to the graduations on the scale beam and also preventing the poise from turning on its supporting rod. From the front edge of the head of the portion $a$, of the poise, an outwardly projecting hand $h$, is secured, which has a pin projecting from its inner surface that fits into a spiral groove $i$, formed in the periphery of the portion $b$, of the poise. To the right and parallel with the said spiral groove $i$, graduated and numbered lines $j$, are formed on the periphery of the said portion $b$, of the poise.

In placing the compound poise upon the rod $c$, above the scale beam, the head of the portion $a$, of said poise must always be innermost, or on the side nearest to the fulcrum of the beam.

By sliding the poise upon the rod $c$, the tons, hundreds, or smaller series of pounds may be indicated by the hand $g$, and the graduating marks on the scale beam. For indicating the smaller fractions of weight, the portion $b$, of the poise must be turned, which will cause it to slide outward—by the action of the pin on the hand $h$, working in the spiral groove $i$, in the periphery of the said turning portion $b$—and the point of the said hand $h$, will indicate the desired nicety of weight by means of the graduations $j$, on the said turning portion of the poise. Thus it will be perceived, that by means of the peculiar arrangement and operation of my improved compound weighing poise, smaller fractions of weight can be indicated than it is possible to accomplish by any other arrangement of a scale beam and poise.

What I claim as my invention and desire to secure by Letters Patent, is—

The peculiar arrangement and operation of the respective parts of my improved compound weighing poise; viz; combining the outer portion $b$, of said poise with the main portion $a$ thereof in such a manner that the act of rotating the outer portion of the poise will move it longitudinally upon the main portion thereof by a graduated movement and at the same time indicate the different leverage action thereby produced upon the scale beam, by means of a toothed horizontal index on the main portion of the poise and a spiral groove and a numbered spiral scale on the periphery of the outer portion of the poise, while the entire poise can be moved longitudinally upon a rod situated immediately above the scale beam and the leverage exerted by said poise, when its respective parts are compactly united, be indicated by a vertical index descending from the main portion of said poise immediately in front of the numbered scale of the scale-beam, all substantially as herein set forth.

The above specification of my improvements in scales signed and witnessed this 22d day of October, 1855.

ELNATHAN SAMPSON.

Witnesses:
J. D. ATWELL,
F. W. COE.